(12) United States Patent
Clark et al.

(10) Patent No.: US 9,681,304 B2
(45) Date of Patent: Jun. 13, 2017

(54) NETWORK AND DATA SECURITY TESTING WITH MOBILE DEVICES

(71) Applicant: Websense, Inc., San Diego, CA (US)

(72) Inventors: Jason Clark, St. Louis, MO (US); Dave Baker, San Diego, CA (US)

(73) Assignee: Websense, Inc., San Diego, CA (US)

( * ) Notice: Subject to any disclaimer, the term of this patent is extended or adjusted under 35 U.S.C. 154(b) by 106 days.

(21) Appl. No.: 14/188,571

(22) Filed: Feb. 24, 2014

(65) Prior Publication Data

US 2015/0031332 A1  Jan. 29, 2015

Related U.S. Application Data

(60) Provisional application No. 61/768,220, filed on Feb. 22, 2013.

(51) Int. Cl.
| | |
|---|---|
| *H04M 1/66* | (2006.01) |
| *H04W 12/12* | (2009.01) |
| *H04L 29/06* | (2006.01) |
| *H04W 12/02* | (2009.01) |

(52) U.S. Cl.
CPC ......... *H04W 12/12* (2013.01); *H04L 63/1433* (2013.01); *H04W 12/02* (2013.01)

(58) Field of Classification Search
CPC ..... H04W 12/02; H04W 12/06; H04W 12/08; H04W 12/12; H04W 24/00
USPC ................. 455/410, 411, 423, 424
See application file for complete search history.

(56) References Cited

U.S. PATENT DOCUMENTS

| | | | | |
|---|---|---|---|---|
| 6,286,050 | B1 * | 9/2001 | Pullen ............... | G06F 17/30861 707/E17.107 |
| 7,266,845 | B2 * | 9/2007 | Hypponen ........... | G06F 21/564 709/246 |
| 8,055,767 | B1 * | 11/2011 | Forristal ............ | H04L 63/1416 370/230 |
| 8,056,134 | B1 * | 11/2011 | Ogilvie ................ | G06F 21/566 713/187 |
| 9,088,555 | B2 * | 7/2015 | Koved ................... | H04L 63/08 |
| 2006/0064399 | A1 * | 3/2006 | De Sio ............... | G06F 17/3089 |

(Continued)

OTHER PUBLICATIONS

Turla, Jay, "Transforming your Android Phone into a Network Pentesting Device," Exploit Development 10, Oct. 30, 2012, 16 pgs., InfoSec Institute.

*Primary Examiner* — Temica M Beamer
(74) *Attorney, Agent, or Firm* — Schwegman Lundberg & Woessner, P.A.

(57) ABSTRACT

The present invention provides a network and data security testing app for mobile devices such as an Apple iPad, which is connected to the Internet via a wireless network. The app downloads and stores one or more network security or data loss test cases from a centralized server, which are then executed on the mobile device. For example, a test case attempts to access predetermined web pages through the wireless network and then determines whether access was granted. In another example, a test case attempts to transmit sensitive data through the network. Results of the test case are displayed on the mobile device and uploaded to the centralized server. The network and data security testing app also identifies whether access was granted to web pages hosting botnets, malicious web exploits, malicious web obfuscation, malicious iframe redirection, and malware files.

16 Claims, 6 Drawing Sheets

(56) References Cited

U.S. PATENT DOCUMENTS

| | | | |
|---|---|---|---|
| 2009/0124250 A1* | 5/2009 | Topaltzas | H04W 24/06 455/423 |
| 2011/0088084 A1* | 4/2011 | Yasaki | G06F 21/6218 726/5 |
| 2012/0265824 A1* | 10/2012 | Lawbaugh | G06F 11/3089 709/206 |
| 2013/0205361 A1* | 8/2013 | Narayanaswamy | H04W 12/12 726/1 |
| 2013/0227078 A1* | 8/2013 | Wei | H04L 67/02 709/219 |
| 2013/0246609 A1* | 9/2013 | Topchy | G06F 17/30899 709/224 |
| 2014/0289855 A1* | 9/2014 | Shulman | H04L 63/1433 726/23 |

* cited by examiner

NETWORK AND DATA SECURITY TESTING WITH MOBILE DEVICES

CROSS-REFERENCE TO RELATED APPLICATION

The present application claims priority to U.S. Provisional Patent Application No. 61/768,220, filed on Feb. 22, 2013, and entitled "System and Method for Network Penetration Testing" the entire disclosure of which is incorporated by reference herein.

BACKGROUND OF THE INVENTION

1. Field of Invention

The present invention relates to network and data security and more specifically, to a mobile device application for testing and demonstrating network security threats and defenses (or lack thereof).

2. Description of Related Art

Network and data security has become increasingly important in mobile computing. It is of particular concern as it relates to the security of personal and business information stored on mobile computing devices such as smartphones and tablets. Mobile devices collect and compile an increasing amount of sensitive information to which access must be controlled to protect the privacy and intellectual property of the user. All mobile devices, as computers in general, are preferred targets of attacks. The attacks exploit weaknesses that come from communications protocols, web browsers, operating systems, unknown malware, and mobile applications (a.k.a., "mobile apps" or just "apps").

As mobile devices are a point of access to the internet, they can be compromised as easily as computers with malware. Malware is a computer program that aims to harm the system in which it resides. Trojans, worms, and viruses are all considered malware. Malware can be unintentionally downloaded through seemingly innocuous web pages and Internet sites. Malware infestation may cause serious performance problems as it tries to read, write or broadcast data from the mobile device.

Other real-world attacks originate over wireless networks such as Wi-Fi, which is a popular networking technology that is based on the Institute of Electrical and Electronics Engineers' (IEEE) 802.11 standards. All types of computer networks are subject to attacks from malicious sources. An attack is any attempt to destroy, expose, alter, disable, steal or gain unauthorized access to or make unauthorized use of an asset.

Standard security defenses, such as firewalls, intrusion detection systems, and antivirus software, are common mechanisms that guard computers against outsider as well as insider attacks. The use of a firewall, for example, limits the access of outsiders to an internal network, and an intrusion detection system detects intrusion attempts by outsiders. Inside attacks can be prevented through antivirus scans that detect Trojans installed on mobile computers, which send out confidential information. Often, mobile devices become targets of attacks because they can move from a network with good security defenses to a network with weak or non-existent security defenses. The goal of many attacks is theft of data stored inside a network and transmitting the stolen data to outside the network.

Security testing is a process to determine that a computer system protects data and maintains functionality as intended. Internal and external security controls are evaluated through a methodically planned simulated attack that imitates threats from malicious outsiders and malicious insiders to understand the security weaknesses in a computer system and network.

SUMMARY OF THE INVENTION

The present invention overcomes deficiencies of the prior art by providing a system and method for network and data security testing utilizing software on a mobile device such as, but not limited to an app on a tablet (e.g., Apple iPad) connected to the Internet via a wireless network. The mobile device downloads and stores one or more network security test cases and/or data loss test cases from a centralized server, which are then executed on the mobile device. For example, a test case attempts to access predetermined web pages through the wireless network and then determines whether access was granted, i.e., not prevented. In an embodiment of the invention, the predetermined web pages are known to contain malware. In another example, a test case attempts to send dummy sensitive data (e.g., credit card numbers) and then determines whether the data was sent, i.e., transmission to outside the network was not prevented. Results of the test case(s) are displayed on the mobile device and uploaded to the centralized server. The network security testing software can optionally display a list of vulnerabilities and/or a risk exposure score. Test cases are dynamically updated and validated to account for new means of security attacks.

In an embodiment of the invention, a method of performing network security testing implemented on a mobile computing device connected to a network comprises the steps of: connecting the mobile computing device to a network; downloading, to the mobile computing device, a test case comprising references to web pages; attempting to access the web pages with the mobile computing device through the network; and determining whether access was granted to the web pages. The references to web pages are Uniform Resource Locators. The step of determining whether access was granted comprises identifying a blocked page result. The number of times access was granted to the web pages is determined. The number of times access was granted is presented to a user of the mobile computing device. Determining whether access was granted comprises comparing source code of an accessed web page to predetermined content evidence.

In another embodiment of the invention, a system for determining network security comprises: a mobile computing device in communication with a network; a test case installed on the mobile computing device, the test case comprising references to web pages such that the mobile computing device attempts to access the web pages and determines whether access was granted. The system further comprises a database storing the test case and a server, wherein the server dynamically updates the test case by validating or modifying the references to the web pages. The references to web pages are Uniform Resource Locators. The mobile computing device is configured to determine whether access was granted by determining if a blocked page result was returned when the web page was accessed. The mobile computing device is configured to determine the number of times access was granted. The mobile computing device has a screen and is configured to present the number of times access was granted on the screen.

In another embodiment of the invention, a method of performing data security testing on a network with a mobile computing device having test data stored thereon comprises the steps of: connecting the mobile computing device to the network; attempting to transmit the test data over the network; and determining whether the test data was sent over the network. The test data is transmitted to a predetermined Uniform Resource Locator. The step of determining whether the test data was sent comprises identifying a result code generated by the predetermined Uniform Resource Locator. The test data is downloaded to the mobile computing device.

In yet another embodiment of the invention, a system for performing data security testing on a network comprises: a mobile computing device; and test data stored on the mobile computing device wherein the mobile computing device is configured to attempt transmitting the test data over the network and determine whether the test data was sent. The test data comprises dummy sensitive data. The dummy sensitive data comprises at least one of the following: a credit card number; a social security number; personal data; protected health information, and a password. The mobile computing device is configured to transmit the test data to a predetermined Uniform Resource Locator. The mobile computing device is configured to determine whether the test data was sent by analyzing a result code returned from the predetermined Uniform Resource Locator. The mobile computing device has a screen and is configured to show the results of the transmission of test data on the screen.

The present invention is advantageous as it provides network and data security testing techniques that can be performed on a mobile device such as a smartphone or tablet computer. The present invention is interoperable among various mobile computing systems and may be implemented in mobile operating systems such as, but not limited to Android, iOS, or Windows, the implementation of which are apparent to one of ordinary skill in the art. By diagnosing security threats, the present invention is able to protect networks and mobile devices from future attacks.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
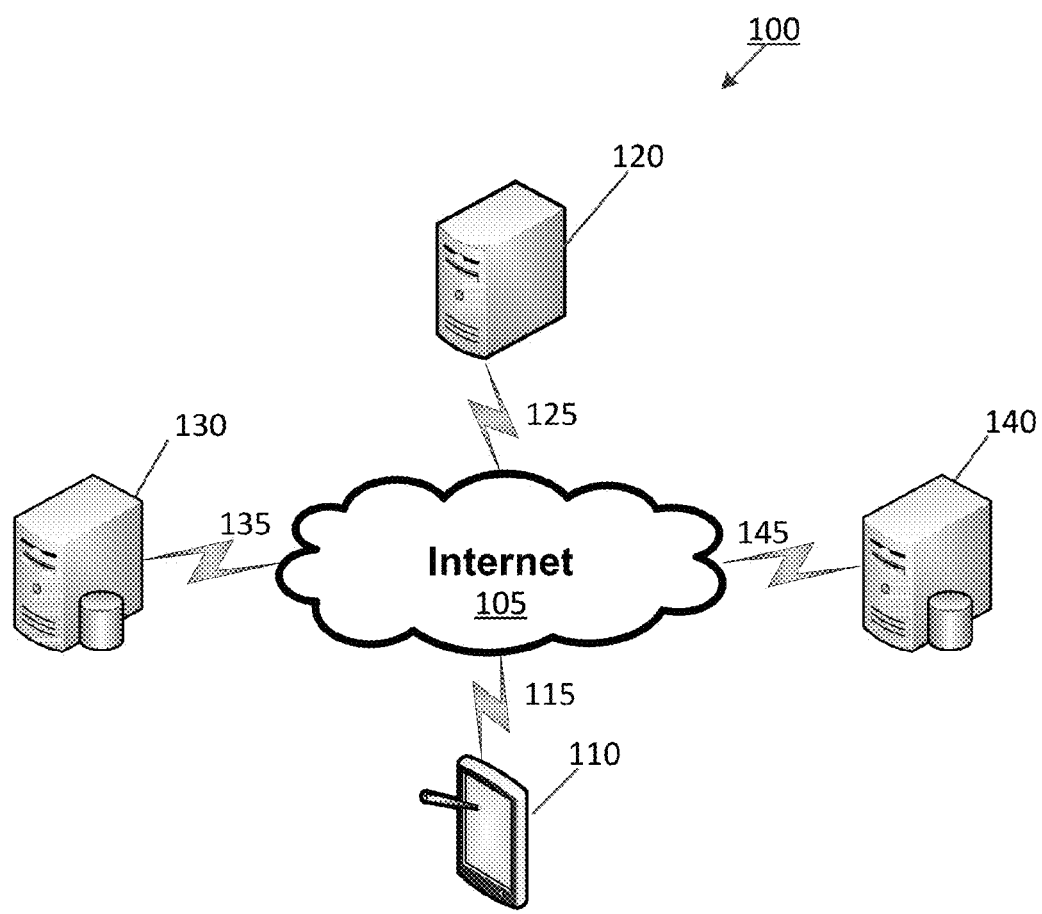
FIG. 1 illustrates a network security test system according to an embodiment of the invention.

Preferred embodiments of the present invention and their advantages may be understood by referring to FIGS. 1-6, wherein like reference numerals refer to like elements. Although the following embodiments are described in the context of software (e.g., app) designed for a portable, wireless mobile device such as, but not limited to an iPad computing tablet, one of ordinary skill in the art readily appreciates that the present invention is applicable to any type of mobile computing device implementing any type of operating system and communicating with the Internet via any type of communications network. Embodiments of the present invention provide computer systems, computer implemented methods as well as computer program products that perform and/or facilitate network security testing and data loss testing on a mobile computing device.

FIG. 1 illustrates a network security test system 100 according to an embodiment of the invention. Particularly, the network security test system 100 comprises a mobile computing device (e.g., tablet) 110, a server 120, a test case database 130, and a test results database 140. The server 120, test case database 130, and test results database 140 may be implemented collectively as a standalone server or as part of a distributed computing system connected through a private network and/or public network such as the Internet 105. The mobile computing device 110, server 120, test case database 130, and test results database 140 communicate with one another and other networked computers (not shown) via Internet 105 and communications links 115, 125, 135, and 145. Communications links 115, 125, 135, and 145 may be enabled by any type of communications medium and protocol, the identification and implementation of which are apparent to one of ordinary skill in the art. For example, communications link 115 comprises a wireless communications medium such as a Wi-Fi network facilitated through an access point (not shown) coupled to the Internet 105. In an embodiment of the invention, Internet 105 is substituted for a private or semi-private computer network. One of ordinary skill in the art readily appreciates that the types of networks, computers, and communication protocols discussed herein are exemplary only and do not limit the scope of the present invention.

Figure 2:
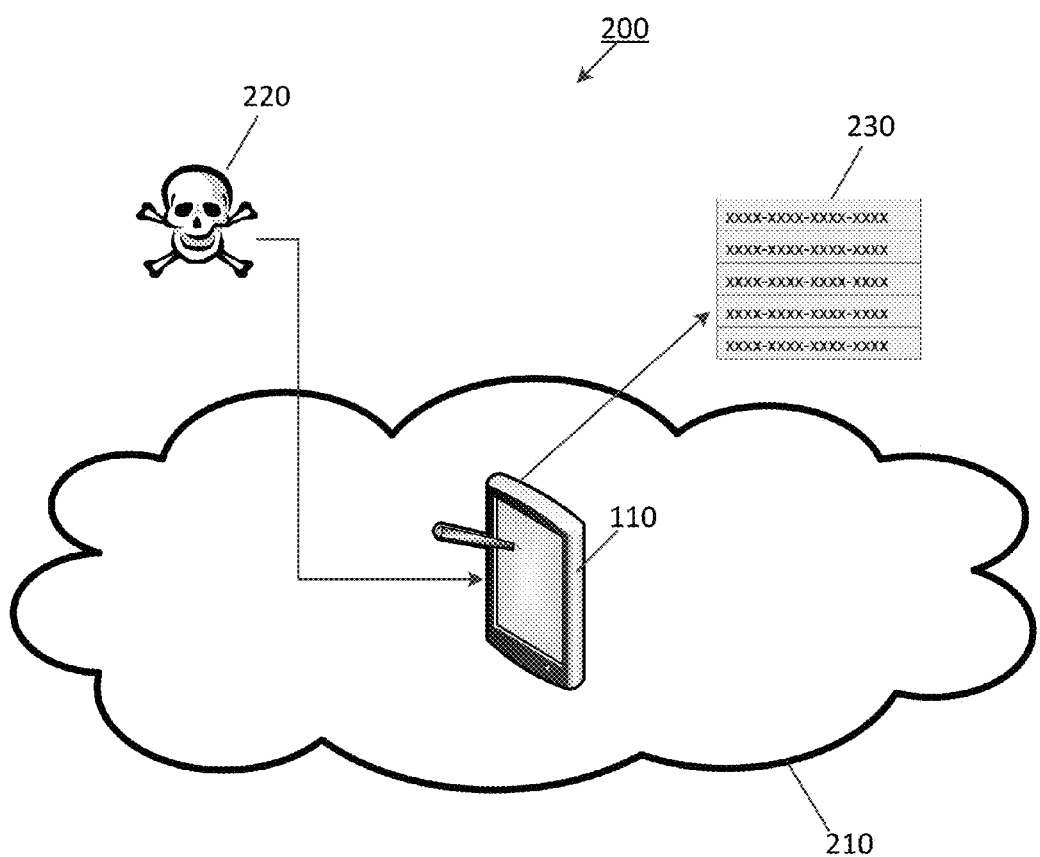
FIG. 2 illustrates a network security defense system according to an embodiment of the invention.

FIG. 2 illustrates a network security defense system 200 according to an embodiment of the invention. Network security defense system 200 comprises the mobile computing device 110 and a network security defense mechanism 210. Network security defense mechanism 210 comprises software and/or hardware for preventing and/or identifying security attacks. For example, security attack 220 represents an attempt to install malware on the mobile device 110. The malware may be unintentionally downloaded to the mobile computing device 110 via a browsed web page. Security attack 230 represents an attempt by an outside interloper to obtain sensitive data from the mobile device 110. Alternatively, security attack 230 represents an attempt by an inside interloper to send sensitive data out of the mobile device 110 for either malicious or accidental reasons. Network security defense mechanism 210 blocks these exemplary attacks 220 and 230. Network security defense mechanism 210 may be provided by a third party security provider. One of ordinary skill in the art recognizes that the network security defense mechanism can comprise any number and types of security techniques, the identification and implementation of which are apparent to one of ordinary skill in the art.

Mobile computing device 110 executes a network and data security testing app, which can be pre-installed or downloaded from an app server (not shown), the implementation of which is apparent to one of ordinary skill in the art. For example, if the tablet utilizes Apple iOS, the network and data security testing app can be downloaded through Apple's App Store. Android based devices can download the app via Google Play. The network and data security testing app comprises software instructions to implement the network and data security test techniques described herein. In an embodiment of the invention, software instructions are written in JavaScript Object Notation (JSON). Alternatively, Objective-C, hypertext markup language (HTML), or cascading style sheets (CSS) may be used. The network and data security testing app comprises a graphical user interface (GUI).

Server 120 facilitates communication of test cases and results among mobile computing device 110 and databases 130 and 140. Server 120 may also configure the network settings of the mobile computing device 110 via the network and data security testing app. In an embodiment of the invention, a user of the mobile computing device 110 registers an account with the server 120 as part of a network and data security test service (or broader security service) and is associated with an account login identification and password. A software token may be implemented at the mobile computing device 110 to ensure secure authentication with the server 120. Upon subsequent use of the network and data security testing app, the user has to logon to the server 120 via the account login identification and password, and secure token. Various marketing and information can be provided to the user via server 120 during execution of the app. The network and data security testing service may be provided as part of a broader computer security service provided by server 120.

Databases 130 and 140 store test cases and results, respectively. In an embodiment of the invention, databases 130 and 140 can be implemented as a single database or alternatively, as distributed databases, the identification and implementation of which are apparent to one of ordinary skill in the art. One or more database management systems, the identification and implementation of which are also apparent to one of ordinary skill in the art, are employed to allow mobile computing device 110, server 120, and other software applications or servers, to capture and analyze test data.

Figure 3:
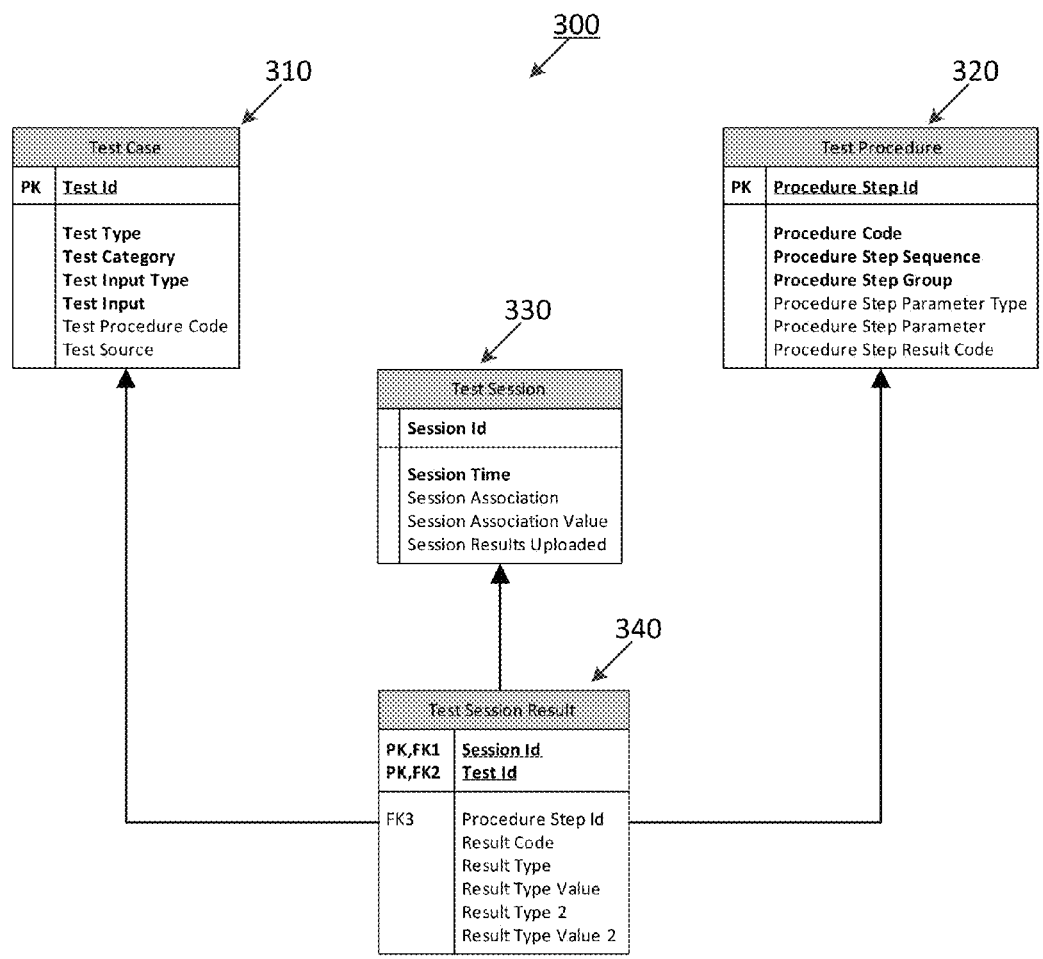
FIG. 3 illustrates a database schema according to an embodiment of the invention.

FIG. 3 illustrates a database schema 300 according to an embodiment of the invention. Database schema 300 comprises a test case 310, a test case procedure 320, a test session 330, and test session result 340. The test case 310 identifies the test procedure 320 to assess security threats, i.e., weaknesses. The test case 310 is stored in the test database 120 and is downloaded to the mobile computing device 110. In an exemplary embodiment of the invention, each test case 310 comprises data fields including, but not limited to a unique identification number, a test type (e.g., web security, data security, or email security), a test category (e.g., malware, malicious redirection, malicious obfuscation, malicious iFrame redirection, or malicious obfuscation), a test procedure code (e.g., blocked page), a test input type (e.g., uniform resource locator or "URL"), an input (e.g., http://www.websense.com), a test source (e.g., remote or local), and a description. The particular relational model, i.e., primary key (PK)—foreign key (FK) relationship, shown in the database schema of FIG. 3 is exemplary. One of ordinary skill in the art readily appreciates that any type of relational model may be used for database management. The test procedure 320 specifies a test procedure code, i.e., test algorithm, which includes a series of test procedure steps and parameters.

In an embodiment of the invention, a test algorithm attempts to access a number of predetermined web pages. For example, the predetermined web pages are known to host malicious code such as malware, botnets, malicious exploits, malicious obfuscation, malicious redirection, or malicious iFrame redirections, and these web pages can be categorized according to these types of threats, respectively.

In other words, the test algorithm intentionally tries to access known "bad" web pages to see if the security defense mechanism 210, if present, prevents access to such. A proper security defense mechanism 210 blocks access and returns a block page result, i.e., an indication that access to the predetermined web page was blocked. If the security defense mechanism 210 was not adequate or not present, then test algorithm would indicate that access to the predetermined was granted.

In an exemplary embodiment of the invention, the test algorithm comprises content evidence, which includes one or more pieces or strings of information known to be included in the predetermined web page. The test algorithm compares this content evidence to the source code of the accessed predetermined web page. Inspecting the source code as opposed to executing it, renders any hosted malware or other security threats nonthreatening. In an alternative embodiment of the invention, the retrieved page is identified through its source or other criteria such as server name or internet protocol (IP) address. If the predetermined web page has been retrieved and the identification does not match the test identification, access to the web page is deemed blocked.

In a related embodiment of the invention, the predetermined web pages are various types of web pages that affect user productivity or consumption of network resources such as bandwidth. For example, security defense mechanism 210 may prevent a user from accessing the following one or more types of web pages: gambling, pornography, fantasy football, Netflix, Olympics, World Cup, and NCAA Basketball March Madness. The test algorithm tests whether access to these types of web pages is blocked.

If the communications network 115 is using an unknown filter, the test algorithm might give false retrieval indications. In order to address such, the retrieved pages are analyzed. For example, if a proxy is used and if a predetermined web page is retrieved, the source of the web page is verified. If the source is the proxy, the page has been deemed blocked. This technique works reliably when an explicit proxy has been implemented by a network administrator.

In an embodiment of the invention, the test algorithm inspects predetermined web pages built from iframes. An iframe (or inline frame) is an HTML document embedded inside another HTML document on a web site. Content of an iframe can change without requiring the user to reload the surrounding page. This capacity is typically enabled through JavaScript. For example, attackers insert iframe code into the saved search results of legitimate web sites. When a visitor clicks on a link from the compromised search tool, he is redirected to a malicious web site by the iframe code. The unsuspecting user's mobile device is then vulnerable to the automatic download of malware. The test algorithm analyzes HTTP responses against the test procedures described above and looks for a matching string in the iframe. If a matching iframe is found, a HTTP GET command is executed against the iframe URL and the HTTP response is reanalyzed as described above.

In another exemplary embodiment of the invention, a test algorithm analyzes data loss through dummy sensitive data. For example, the mobile computing device 110 is provided with predetermined test data mimicking sensitive data. The mobile computing device 110 attempts to transmit the test data over the network 115 to a predetermined Internet address, e.g., a friendly known server. In an embodiment of the invention, the test data comprises at least one of the following dummy sensitive information: a credit card number, a social security number, personal data, protected health information, or a user password. A proper security defense mechanism 210 blocks transmission of the test data. If the security defense mechanism 210 is not adequate or not even present, then the test data would be transmitted. If the predetermined Internet address receives the test data, it returns a result code indicating that that it has received the test data, i.e., the test data has been compromised. If no result code is received within a predetermined time period, the test data is assumed to not have been transmitted. Alternatively, identification of a block page or block alert displayed by the security defense mechanism indicates that the test data has not been compromised.

Test cases are dynamically updated by the server 120. For example, the predetermined web pages are periodically validated and categorized by the type of security of threats hosted in those web pages. For example, certain predetermined web pages may no longer be deemed to pose a security threat and may be removed from a test case. Moreover, the content of those web pages may change and the comparison strings (for matching) have to be revised based on the dynamic content of those web pages. New predetermined web pages may be used as well. Test cases may also be modified at the mobile computing device 110 by a test administrator or user. For example, a test administrator may modify a test case to access a web page chosen by the test administrator.

A test session involves the execution of one or more test cases. In an embodiment of the invention, the each test session 330 is associated with a unique session identifier generated by the mobile computing device 110, a user account identifier, and whether the results have been uploaded to the test results database 140. Other metadata may be included about the test session 330 such as, but not limited to identification of the administrator who ran the test. The test session result 340 comprises the results of one or more test cases and is uploaded to the test results database 140. The test session result 340 comprises the session identifier and other metadata.

Figure 4:
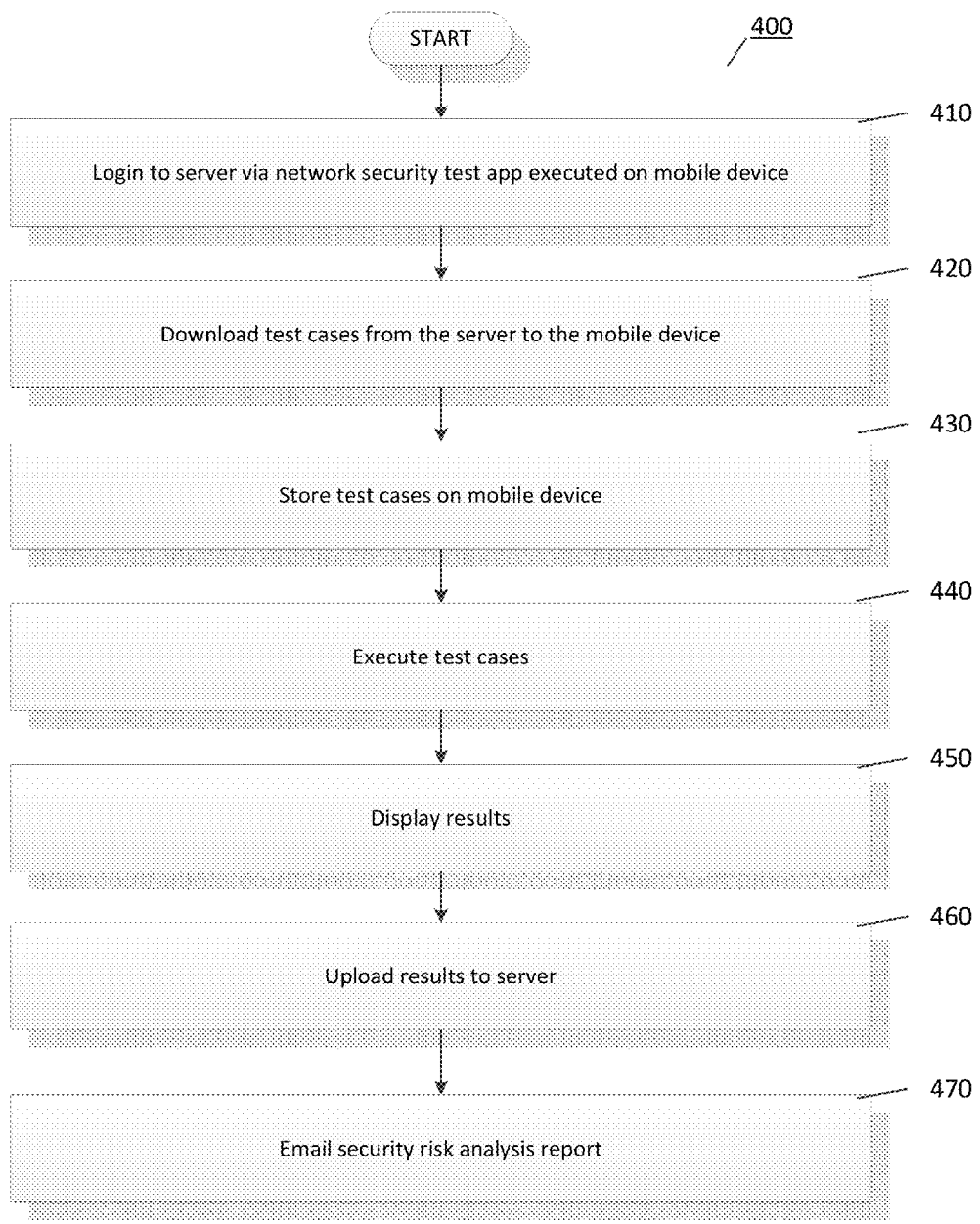
FIG. 4 illustrates a network security test method according to an embodiment of the invention.

FIG. 4 illustrates a network security test method 400 according to an embodiment of the invention. The method 400 begins by the user of mobile computing device 110 logging in (step 410) to the server 120 via the network security test app. One or more test cases are downloaded (step 420) from the server 120 to the mobile computing device 110. The test case(s) are stored (step 430) on the mobile computing device 110. In an embodiment of the invention, the test cases are stored as an encrypted file, the implementation of which is apparent to one of ordinary skill in the art. The test case(s) are then executed (step 440) and the results are displayed (step 450) and uploaded (step 460) to server 120. In an embodiment of the invention, the method 400 optionally comprises the further steps of emailing (step 470) a security risk analysis report to a user's email address.

Figure 5:
FIG. 5 illustrates a user interface screen showing test results according to an embodiment of the invention.

FIG. 5 illustrates a user interface screen 500 according to an embodiment invention. User interface screen 500 comprises two dials: a risk exposure dial and a progress dial. The risk exposure dial indicates, for example, the number of predetermined web pages accessed divided by the total number of predetermined web pages attempted to be accessed. The progress dial indicates the percentage of test completion. Icons are provided to enable a user to begin a test or view results of a past test.

Figure 6:
FIG. 6 illustrates a user interface screen showing test results according to an embodiment of the invention.

FIG. 6 illustrates a user interface screen 600 according to an embodiment of the invention. Here, the user interface screen displays network security test results. For example, testing has identified the predetermined web pages that were accessible by category: botnets, malicious web exploits, malicious web obfuscation, malicious web redirection, malicious iframe redirection, and malware files. Here, access was granted to 8 botnets, 22 malicious web exploits, 28 malicious web obfuscations, 14 malicious web redirections; 13 malicious iframe redirections, and 13 malware files. Certain web page access attempts resulted in an error or an undetermined result (i.e., it was not clear whether a block page resulted or access was granted). In total, 98 web pages were accessible, which provides a risk exposure of 96.1%. For each type of security risk identified, a details icon is provided where the user can get more detailed information on the specifics of these identified risks.

In an embodiment of the invention, mobile computing device 110 is a laptop executing network security testing software, which implements the techniques noted above. One of ordinary skill in the art recognizes that any type of computing mobile device can be used such as, but not limited to, a smartphone, Mobile Internet Device (MID), an Ultra-Mobile Personal Computer (UMPC), phablet computer, Personal Digital Assistant (PDA), web pad, handheld personal computer, navigation system, and interactive entertainment devices, such as game consoles, Television (TV) sets and Set-Top Boxes (STBs).

Internet 105 and communications links 115, 125, 135, and 145 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A method of performing network security testing implemented on a mobile computing device connected to a network, the method comprising:

connecting the mobile computing device to a network security test system, the network security test system including a server, a test case database, and a test results database;

downloading, to the mobile computing device through the server and from the test case database, a test case comprising a test procedure code specifying a series of test procedure steps and parameters, wherein the parameters comprise references to web pages known to host malicious code, wherein the test procedure code includes instructions that, when executed by the mobile device, cause the mobile device to access the web pages, and wherein the test procedure code includes content evidence that includes one or more pieces or strings of information known to be included in a web page of the web pages;

attempting, by executing the test procedure code, to access the web pages with the mobile computing device through the network;

determining whether access was granted to the web pages by comparing, to the content evidence at least one of a server name, internet protocol (IP) address, and source code of an accessed web page returned from attempting to access the web pages; and providing, by the mobile computing device through the server and to the test results database, test session results, the test session results including a unique test session identifier, a user account identifier indicating a user of the mobile computing device, and data indicating whether the access was granted to the web pages.

2. The method of claim 1, wherein the references web pages are Uniform Resource Locators.

3. The method of claim 2, wherein the determining whether access was granted comprises identifying a blocked page result.

4. The method of claim 1, further comprising updating the content evidence to reflect a change in a web page of the web pages.

5. The method of claim 4, further comprising presenting a number of times access was granted to a user of the mobile computing device through a graphical user interface (GUI) of the mobile computing device.

6. The method of claim 1, wherein determining whether access was granted comprises comparing the source code of the accessed web page to the content evidence, wherein the web page includes inline frames, and wherein the method further comprises:

analyzing a hypertext transfer protocol (HTTP) response against the content evidence by determining whether a string, in the HTTP response, matches a string in the content evidence, wherein the string indicates a specific inline frame exists in the web page;

issuing an HTTP get command for a uniform resource locator (URL) in the inline frame; and wherein determining whether access was granted to the web pages includes determining whether access was granted to a web page associated with the URL.

7. A system for determining network security, the system comprising:

a network security test system including a server, a test case database, and a test results database;

a mobile computing device in communication with the network security system, the mobile device configured to:

connect to the network security test system;

download, through the server and from the test case database, a test case;

install the test case on the mobile computing device, the test case comprising test procedure code specifying a series of test procedure steps and parameters, wherein the parameters comprise references to web pages known to host malicious code, wherein the test procedure code includes instructions that when executed by the mobile device, cause the mobile device to access the web pages, and wherein the test procedure code includes content evidence that includes one or more pieces or strings of information known to be included in a web page of the web pages;

attempt to access the web pages and determines whether access was granted;

determine whether access was granted to the web pages by comparing, to the content evidence at least one of a server name, internet protocol (IP) address, and source code of an accessed web page returned from attempting to access the web pages; and provide, by the mobile computing device through the server and to the test results database, test session results, the test session results including a unique test session identifier, a user account identifier indicating a user of the mobile computing device, and data indicating whether the access was granted to the web pages.

8. The system of claim 7, wherein the test case database stores the test case and the server, wherein the server dynamically updates the test case by validating or modifying the references to the web pages.

9. The system of claim 7, wherein the references to web pages are Uniform Resource Locators.

10. The system of claim 9, wherein the mobile computing device is configured to determine whether access was granted by determining if a blocked page result was returned when the web page was accessed.

11. The system of claim 8, wherein the mobile computing device is configured to determine the number of times access was granted.

12. The system of claim 11, wherein the mobile computing device has a screen and is configured to present the number of times access was granted on the screen.

13. A non-transitory machine-readable storage device including instructions stored thereon that, when executed by a mobile computing device, cause the mobile computing device to perform a method of data security testing, the method comprising:

connecting the mobile computing device to a network security test system, the network security test system including a server, a test case database, and a test results database;

downloading through the server and from the test case database, a test case comprising a test procedure code specifying a series of test procedure steps and parameters, wherein the parameters comprise references to web pages known to host malicious code, wherein the test procedure code includes instructions that, when executed by the mobile device, cause the mobile device to access the web pages, and wherein the test procedure code includes content evidence that includes one or more pieces or strings of information known to be included in a web page of the web pages;

attempting, by executing the test procedure code, to access the web pages with the mobile computing device through the network;

determining whether access was granted to the web pages by comparing, to the content evidence at least one of a server name, internet protocol (IP) address, and source code of an accessed web page returned from attempting to access the web pages; and providing, through the server and to the test results database, test session results, the test session results including a unique test session identifier, a user account identifier indicating a user of the mobile computing device, and data indicating whether the access was granted to the web pages.

14. The storage device of claim 13, wherein the references to web pages are uniform Resource Locators.

15. The storage device of claim 14, wherein determining whether access was granted includes identifying a blocked page result.

16. The storage device of claim 14, further comprising updating the content evidence to reflect a change in a web page of the web pages.

* * * * *